(12) United States Patent
Brack et al.

(10) Patent No.: US 7,365,149 B2
(45) Date of Patent: Apr. 29, 2008

(54) EQUIPMENT CLEANING IN THE MANUFACTURE OF POLYCARBONATES

(76) Inventors: Hans-Peter Brack, Schulhausstr. 64, Herrliberg (CH) 8704; Maarten Antoon Jan Campman, Kalmoesberg 3, Roosendaal (CH); Laurus van der Wekke, Achterhoekse straat 55 A, Rucphen (NL); Dennis James Patrick Maria Willemse, Odiliadonk 10, Roosendaal (NL)

( * ) Notice: Subject to any disclaimer, the term of this patent is extended or adjusted under 35 U.S.C. 154(b) by 183 days.

(21) Appl. No.: 11/275,110

(22) Filed: Dec. 12, 2005

(65) Prior Publication Data

US 2007/0135611 A1 Jun. 14, 2007

(51) Int. Cl.
*C08G 64/00* (2006.01)

(52) U.S. Cl. .................. 528/196; 428/141; 428/156; 428/323; 510/295; 510/296; 510/407; 510/438; 528/198

(58) Field of Classification Search .............. 428/141, 428/156, 323; 510/295, 296, 407, 438; 528/196, 198
See application file for complete search history.

(56) References Cited

U.S. PATENT DOCUMENTS

| | | | |
|---|---|---|---|
| 4,323,668 A | 4/1982 | Brunelle | |
| 4,452,933 A | 6/1984 | McCready | |
| 4,452,969 A | 6/1984 | McCready | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,380,345 B1 | 4/2002 | Uenishi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,525,171 B2 | 2/2003 | Takemoto et al. | |
| 6,548,623 B2 | 4/2003 | Brunelle et al. | |
| 6,562,936 B1 * | 5/2003 | Hatono et al. ............ | 528/196 |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,790,929 B2 | 9/2004 | Silvi et al. | |
| 2002/0052467 A1 | 5/2002 | Takemoto et al. | |
| 2002/0132957 A1 | 9/2002 | Brack et al. | |
| 2003/0050427 A1 | 3/2003 | Brunelle et al. | |
| 2003/0060649 A1 | 3/2003 | Burnell et al. | |
| 2003/0139529 A1 | 7/2003 | O'Neil et al. | |
| 2003/0149223 A1 | 8/2003 | McCloskey et al. | |
| 2003/0232957 A1 | 12/2003 | Silvi et al. | |
| 2003/0236384 A1 | 12/2003 | Silvi et al. | |
| 2004/0054238 A1 | 3/2004 | Ban et al. | |
| 2004/0068086 A1 | 4/2004 | Day et al. | |
| 2004/0087756 A1 | 5/2004 | Ramesh et al. | |
| 2005/0261460 A1 | 11/2005 | Cella et al. | |

FOREIGN PATENT DOCUMENTS

| | | |
|---|---|---|
| CN | 1464075 | 12/2003 |
| EP | 128444 | 12/1984 |
| EP | 819717 | 1/1998 |
| EP | 1120435 | 8/2001 |
| EP | 1300432 | 4/2003 |
| EP | 1018529 | 3/2004 |
| JP | 4007329 | 1/1992 |
| JP | 5009282 | 1/1993 |
| JP | 6056984 | 3/1994 |
| JP | 6200007 | 7/1994 |
| JP | 6200008 | 7/1994 |
| JP | 7062076 | 3/1995 |
| JP | 9124786 | 5/1997 |
| JP | 10-101786 | 4/1998 |
| JP | 10-101787 | 4/1998 |

(Continued)

*Primary Examiner*—Terressa Boykin
(74) *Attorney, Agent, or Firm*—Marina Larson & Associates, LLC

(57) ABSTRACT

A surface of a melt polymerization reactor system having residual reaction components of a melt polymerization reaction thereon can be cleaned by introducing a cleaning agent having a phenolic compound to the polymerization reactor system and into contact with the surface of the melt polymerization reactor system having the residual reaction components of a melt polymerization reaction thereon. The residual reaction components of the melt polymerization reaction include polycarbonate oligomers or polymers or their degradation products. Further, the cleaning agent is maintained in contact with the surface for a period of time and at a temperature sufficient to substantially remove the residual reaction components from the surface.

28 Claims, No Drawings

FOREIGN PATENT DOCUMENTS

| | | |
|---|---|---|
| JP | 11-302228 | 11/1999 |
| JP | 2000034344 | 2/2000 |
| JP | 2000129112 | 5/2000 |
| JP | 2001072758 | 3/2001 |
| JP | 2002020478 | 1/2002 |
| JP | 2002060482 | 2/2002 |
| JP | 2002155162 | 5/2002 |
| JP | 2002309015 | 10/2002 |
| JP | 2002363276 | 12/2002 |
| JP | 2003048975 | 2/2003 |
| JP | 2003079388 | 3/2003 |
| JP | 2003200133 | 7/2003 |
| JP | 2003245964 | 9/2003 |
| JP | 2003266436 | 9/2003 |
| JP | 2004197004 | 7/2004 |
| TW | 0538072 | 6/2003 |
| TW | 0548292 | 8/2003 |
| WO | 98/056337 A1 | 12/1998 |
| WO | 03010218 | 2/2003 |
| WO | 03010219 | 2/2003 |
| WO | 03010220 | 2/2003 |
| WO | 03040208 | 5/2003 |
| WO | 03106149 | 12/2003 |
| WO | 2004033531 | 4/2004 |
| WO | 2004060962 | 7/2004 |

\* cited by examiner

EQUIPMENT CLEANING IN THE MANUFACTURE OF POLYCARBONATES

BACKGROUND

In order to maximize the output of a melt polycarbonate production plant it would be optimal to run the melt polycarbonate production equipment continuously. Unfortunately this is not practicable since it has been observed that the quality of the product polycarbonate will deteriorate over time as residual reaction components contained within the polycarbonate production equipment degrade.

Further, with the advent of specialty polymers, it is often desirable for a plant to be able to produce a wide range of polycarbonate homopolymer and copolymer compositions. The plant operator would often find it more cost efficient to employ the same production equipment to produce these wide ranges of different polymers. It would be extremely beneficial to find a method and a cleaning agent that could quickly clean the melt polycarbonate production equipment, without introducing foreign contaminants to the system, to facilitate changeover from the manufacture of one specialty polycarbonate to another.

SUMMARY OF INVENTION

A superior cleaning agent and a method of cleaning polycarbonate production equipment has now been found. The method and agent also minimize the risk of contaminating the equipment with foreign materials. In one embodiment, the method includes the steps of introducing a cleaning agent having an ester-substituted phenol to the melt polymerization reactor system and into contact with the surface of the melt polymerization reactor system having residual reaction components of a melt polymerization reaction thereon. The residual reaction components of the melt polymerization reaction include polycarbonate oligomers or polymers. Further, the cleaning agent is maintained in contact with the surface for a period of time and at a temperature sufficient to substantially remove the residual reaction components from the surface. Another step of the method includes removing the cleaning agent and the removed residual reaction components from the melt polymerization reactor system.

DETAILED DESCRIPTION OF INVENTION

A superior cleaning agent and a method of cleaning polycarbonate production equipment has now been found. The method and agent also minimize the risk of contaminating the equipment with foreign materials.

The present invention may be understood more readily by reference to the following detailed description of preferred embodiments of the invention and the examples included therein. In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

"Polycarbonate", unless described otherwise, refers to polycarbonates incorporating repeat units derived from at least one dihydroxy compound and includes copolyestercarbonates, for example a polycarbonate comprising repeat units derived from resorcinol, bisphenol A, and dodecandioic acid. Nothing in the description and claims of this application should be taken as limiting the polycarbonate to only one kind of dihydroxy residue unless the context is expressly limiting. Thus, the application encompasses copolycarbonates with residues of 2, 3, 4, or more types of different dihydroxy compounds. The term polycarbonate refers to either oligomers or larger polymers unless the context clearly indicates otherwise.

"Oligomer" refers to polycarbonate polymers having from 2 to 40 repeat units derived from dihydroxy compound(s).

As used herein, the term "melt polycarbonate" refers to a polycarbonate made by the transesterification of a diaryl carbonate with a dihydroxy compound.

"Repeat unit(s)" means the block units or dihydroxy residues that are contained within the polymer chain of the polycarbonate and are derived from the starting dihydroxy compositions described below.

As used herein, the term "residual reaction components" refers to a polycarbonate oligomers, polymers, and their degradation products unless the context indicates otherwise.

As used herein with reference to the period of time the cleaning agent is maintained in contact with the surface at the temperature at which the reactor is cleaned, the term "substantially remove the residual reaction components from the surface" means that more than 20%, more preferably more than 50%, and still more preferably more than 90% of the residual reaction components are removed from the surface.

"High molecular weight polycarbonates" are herein defined as polycarbonates having a weight average molecular weight, $M_w$, greater than 18,000 g/mol, for example greater than 20,000 g/mol, and more preferably greater than 22,000 g/mol (molecular weights measured relative to polystyrene (PS) standards). Depending on the characteristics of the resulting polycarbonate a $M_w$ of greater than 25,000 g/mol (molecular weights measured relative to polystyrene (PS) standards) may be preferable.

As used herein with regard to the method of forming polycarbonate of the present invention, the term "cleaning" refers to reducing the amount of residual reaction components in the product of the next polycarbonate run to a commercially acceptable level, for example, less than 2,500 ppm, more preferably less than 1,000 ppm, and most preferably less than 500 ppm.

Numerical values in the specification and claims of this application reflect average values. Furthermore, the numerical values should be understood to include numerical values which are the same when reduced to the same number of significant figures and numerical values which differ from the stated value by less than the experimental error of the measurement technique used in the present application to determine the value.

Melt Polymerization Reactor System

Typically a melt polymerization reactor system comprises an oligomer forming section and polymer weight building section. The types of equipment used in each these sections are not particularly limited and may include stirred or unstirred vessels, extruders, heat exchangers, flash tanks and the like. The cleaning agent may be introduced to any one piece of equipment, any combination of equipment, or to every piece of equipment of the melt polymerization system.

The Cleaning Agent

It is preferred that the cleaning agent of the present invention contain compounds that are not foreign to the process of manufacturing the polycarbonate in the melt polymerization reactor system that is the object of the cleaning. Stated differently, it is often preferred that the cleaning agent be selected such that it only contains compounds that will be present during subsequent runs on the equipment of the melt reaction system. Foreign contaminants introduced to the system may result in undesirable product polycarbonate.

In preferred melt polymerization reactions the carbonate source is a diaryl carbonate. As the melt reaction proceeds, the diaryl carbonate is consumed and a phenolic by-product is generated. The structure of the phenolic by-product will depend on what diaryl carbonate (e.g. an ester-substituted or non-ester-substituted diaryl carbonate) is employed as the carbonate source. For example, if a non-ester-substituted diarylcarbonate such as diphenyl carbonate (DPC) is employed, a typical phenolic by-product will be a non-ester-substituted phenol, such as phenol. If an ester-substituted diaryl carbonate such as bis methyl salicyl carbonate (BMSC) is employed, a typical phenolic by-product will be an ester-substituted phenol such as methyl salicylate. Since it is desirable not to introduce foreign materials into the reactor system, it has been found beneficial to use a corresponding phenolic compound as the cleaning agent. For similar reasons, in the embodiments where the cleaning agent further comprises a basic compound it is often preferred that the basic compound be a catalyst used in the melt transesterification reaction.

Ester-Substituted Phenol as Cleaning Agent

In one embodiment of the present invention it has been found that an ester-substituted phenol provides a superior cleaning agent for cleaning melt polymerization reactor systems that employ ester-substituted diaryl carbonates as the carbonate source. It is believed that a high concentration of the ester-substituted phenol effects a reverse polymerization reaction that breaks down the polycarbonate oligomers and polymers and their degradation products (the residual reaction components) into smaller units (lower molecular weight species) comprising monomers, smaller oligomers, and smaller polymers. Further, depending on the cleaning conditions and the solubility parameters of the residual reaction components, the ester-substituted phenol can act as a solvent for dissolving the residual reaction components from the surface of the reactor.

The ester-substituted phenol has the structure,

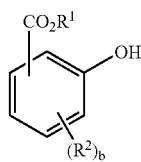

wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4.

Examples of suitable ester-substituted phenols (i.e. activated carbonate residues) include methyl salicylate, ethyl salicylate, propyl salicylate, butyl salicylate, 4-chloro methyl salicylate, n-propyl salicylate, benzyl salicylate and mixtures thereof. Typically, methyl salicylate is preferred as BMSC is frequently preferred as a carbonate source for melt polycarbonate production.

Ester-substituted phenol may be a "pure" product (i.e. a product of a process whose primary purpose is production of the ester-substituted phenol) or it may be a by-product stream from a polymerization reaction. Since the ester-substituted phenol is a by-product from a melt reaction using an ester-substituted diaryl carbonate, it is often preferred that it be collected, recycled, and used for the subsequent cleaning.

Phenolic Compound & Basic Compound as Cleaning Agent

In another embodiment, the cleaning agent comprises a phenolic compound as well as a basic compound that is used as a catalyst in the melt transesterification reaction. In some reactor systems, it has been found that the combination of the phenolic compound and the basic compound results in a quicker and more effective cleaning agent as compared to solely using the phenolic compound. It is believed that the combination of a high concentration of the phenolic compound together with a catalyst effects a reverse polymerization reaction that breaks down the polycarbonate oligomers and polymers and their degradation products (the residual reaction components) into smaller units (lower molecular weight species) comprising monomers, smaller oligomers, and smaller polymers. In preferred embodiments the amount of the basic compound present in the cleaning agent is in a range of between 10 ppm and 50,000 ppm, more preferably between 50 ppm and 10,000 ppm, and still more preferably between 100 ppm and 2,000 ppm. Further, depending on the cleaning conditions and the solubility parameters of the residual reaction components, the phenolic compound can act as a solvent for dissolving the residual reaction components from the surface of the reactor.

The phenolic compound may be either an ester-substituted phenol as described above or a non-ester-substituted phenol. In one embodiment a non-ester-substituted phenol suitable for use with the present invention is of the following structure:

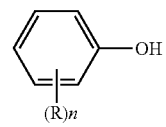

where each R is independently selected from hydrogen, branched or linear alkyl or aryl, and n is an integer between 1 and 5. Suitable and non-limiting examples of chemicals having this structure are phenol and alkyl phenols shown in tables 1 to 3. In a polymerization reaction that uses diphenyl carbonate (DPC) as a the carbonate source, cleaning with phenol is often preferred.

TABLE 1

| Name | CAS # | Structure |
|---|---|---|
| o-Cresol | 95-48-7 | (structure) |
| p-Cresol | 106-44-5 | (structure) |
| 2-Ethylphenol | 90-00-6 | (structure) |
| 4-Ethylphenol | 123-07-9 | (structure) |
| 2-Isopropylphenol | 88-69-7 | (structure) |

TABLE 2

| Name | CAS # | Structure |
|---|---|---|
| 2-n-Propylphenol | 644-35-9 | (structure) |
| 3-Ethylphenol | 620-17-7 | (structure) |
| 4-n-Propylphenol | 645-56-7 | (structure) |
| 26-Dimethylphenol | 576-26-1 | (structure) |

TABLE 3

| Name | CAS # | Structure |
|---|---|---|
| 2,6-Di-isopropyl-phenol | 2078-54-8 | (structure) |
| 2-Ethyl-6-methyl-phenol | | (structure) |
| 3,5-Dimethyl-phenol | 108-68-9 | (structure) |
| 2,4,6-Trimethyl-phenol | 527-60-6 | (structure) |
| para-cumyl phenol | | (structure) |

In another embodiment another non-ester-substituted phenol suitable for use with the present invention is of the following structure:

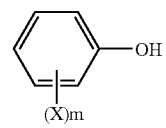

where X is an electron-withdrawing substituent, m is an integer between 1 and 3, and the electron-withdrawing substituent is located at the ortho and/or para positions relative to the OH substituent. Non-limiting examples of chemicals having this structure are illustrated in tables 4 through 7 below.

TABLE 4

| Name | CAS # | Structure |
|---|---|---|
| 2'-Hydroxyacetophenone | 118-93-4 | (structure) |

TABLE 4-continued

| Name | CAS # | Structure |
|---|---|---|
| 2'-Hydroxypropiophenone | 610-99-1 | 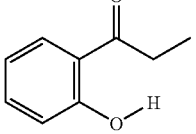 |
| 2'-Hydroxybenzophenone | 117-99-7 | 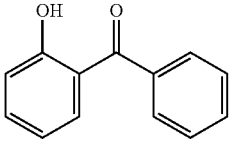 |
| 4'-Hydroxy-3'-methylacetophenone | 876-02-8 | 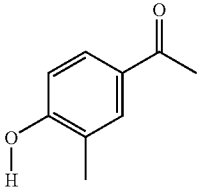 |
| 2-Hydroxy-5-methylbenzophenone | 1470-57-1 | 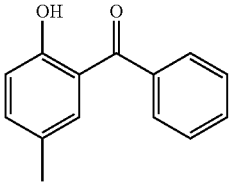 |
| Salicylaldehyde | 90-02-8 | 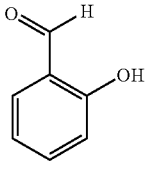 |
| 2-Fluorophenol | 367-12-4 | 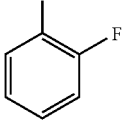 |

TABLE 5

| Name | CAS# | Structure |
|---|---|---|
| 2-Chlorophenol | 95-57-8 | 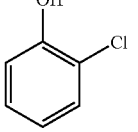 |
| 2-Bromophenol | 95-56-7 | 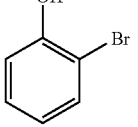 |
| 2-Iodophenol | 533-58-4 | 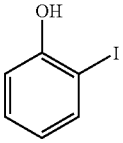 |
| 2-Nitrophenol | 88-75-5 | 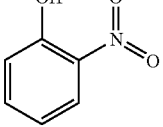 |
| 2-Cyanophenol | 611-20-1 | 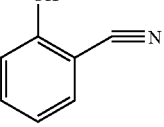 |
| 4-Fluorophenol | 371-41-5 | 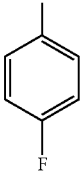 |
| 4-Chlorophenol | 106-48-9 | 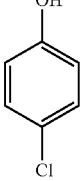 |

TABLE 6

| Name | CAS # | Structure |
|---|---|---|
| 4-Bromophenol | 106-41-2 | 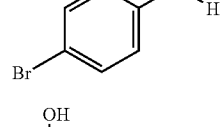 |
| 4-Iodophenol | 540-38-5 | 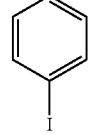 |
| 2,4-Difluorophenol | 387-27-1 | 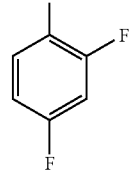 |

TABLE 6-continued

| Name | CAS # | Structure |
|---|---|---|
| 2,4-Dichlorophenol | 120-83-2 | |
| 2,4-Dibromophenol | 615-58-7 | |
| 2,4-Dinitrophenol | 51-28-5 | |
| 2,8-Difluorophenol | 28177-48-2 | |

TABLE 7

| Name | CAS # | Structure |
|---|---|---|
| 2,6-Dichlorophenol | 87-65-0 | |
| 2,6-Dibromophenol | 608-33-3 | |
| 2,4,6-Trifluorophenol | 2268-17-9 | |
| 2,4,6-Trichlorophenol | 88-06-2 | |
| 2,4,6-Tribromophenol | 118-79-6 | |
| 2,4,6-Triiodophenol | 609-23-4 | |
| 3,5-Dibromosalicylaldehyde | 90-59-5 | |

In some embodiments it is desired that the basic compound comprises a metal hydroxide such as NaOH. In other preferred embodiments the basic compound comprises another compound that is used as a catalyst during the production of polycarbonate in the reactor system. This basic compound is preferably thermally decomposable, or volatile, or both thermally decomposable and volatile at a pressure between 0.0 bar and 10.0 and at a temperature of between 50° C. and 350° C.

A basic compound that is thermally decomposable, volatile, or both that is suitable for use in accordance with an embodiment the method of the present invention is quaternary ammonium compound or a quaternary phosphonium compound or a mixture thereof. The quaternary ammonium compound is selected from the group of organic ammonium compounds having structure,

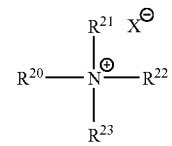

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

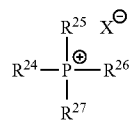

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges are properly balanced. For example, where $R^{20}$-$R^{23}$ are each methyl groups and $X^-$ is carbonate, it is understood that $X^-$ represents ½ ($CO_3^{-2}$).

It has been found that the use of a base in combination with an ester-substituted phenol is particularly effective when compared to the combination of a base with a non-ester-substituted phenol such as phenol. This is because the depolymerization reaction is not as favorable with an ester-substituted phenol as compared to phenol. The addition of a catalyst to the former compound significantly enhances the effectiveness of the cleaning agent.

The methods of the invention may be practiced using a cleaning agent specifically adapted for use in the method. For example, in a preferred embodiment of the present invention a cleaning agent is provided for cleaning a surface of a melt polymerization reactor system having residual reaction components of a melt polymerization reaction thereon, wherein the cleaning agent consists of a phenolic compound and a basic compound, wherein the basic compound is thermally decomposable, volatile, or both thermally decomposable and volatile at a pressure between 0.0 bar and 10.0 and at a temperature of between 50° C. and 350° C. The basic compound is present in an amount of at least 10 ppm. More preferably the basic compound is present in a range of between 10 ppm and 50,000 ppm, for example between 50 ppm and 10,000 ppm and more preferably between 100 ppm and 2,000 ppm.

It is preferred that the basic compound is thermally decomposable, volatile, or both thermally decomposable and volatile at a pressure of between 0.0 bar and 10.0 bar, for example between 0.5 bar and 3.0 bar and at a temperature in a range of between 50° C. and 350° C., for example between 200° C. and 300° C., such as between 210° C. and 230° C. Suitable examples of these basic compounds are tetramethyl ammonium hydroxide, tetrabutyl ammonium hydroxide, tetramethyl ammonium acetate, tetramethyl ammonium formate, tetrabutyl ammonium acetate, methyl tributyl ammonium chloride, tetramethyl ammonium hydroxide, tetrabutyl ammonium chloride or decyl trimethyl ammonium chloride. Also the basic compound may be tetramethyl phosphonium hydroxide, tetramethyl phosphonium acetate, tetramethyl phosphonium formate, tetrabutyl phosphonium hydroxide, or tetrabutyl phosphonium acetate.

In another embodiment the basic compound and the conditions (e.g. temperature and pressure) at which the cleaning occurs are selected so that the base is not immediately decomposable or volatile at the cleaning conditions so that it remains sufficiently present in the cleaning agent to catalyze a depolymerization reaction during the cleaning. After cleaning and the removal of the cleaning agent from the reactor system, the conditions may then be altered so as to decompose, evaporate, or both decompose and evaporate the remaining base from the melt reactor system. For example, if one chooses to clean at a high temperature and a low pressure a more thermally-stable and less volatile base would be desirable. After the cleaning agent is removed from the system the temperature may be increased and/or the pressure decreased to drive off the remaining cleaning agent and base left in the system.

The Cleaning Process

An exemplary method for cleaning the polycarbonate production equipment of the present invention is as follows: Typically, after the completion of a polycarbonate production run on the equipment as described above, a surface thereof that is in contact with the reaction components of the melt reaction will have residual reaction components thereon. The residual reaction components will typically be either an oligomer, a polymer or both. Other residual reaction components may be unreacted dihydroxy compounds (i.e. monomers), impurities, and thermal degradation products of the dihydroxy compounds, the oligomers, and the polymers. A cleaning agent comprising a phenolic compound and base is then introduced to the melt polymerization reactor system and into contact with the surface of the melt polymerization reactor system having residual reaction components of a melt polymerization reaction thereon. It is preferred that the amount of cleaning agent introduced to the reactor system be sufficient to contact the entire polymerization area within the reactor system. The cleaning agent is maintained in contact with the surface for a period of time and at a temperature sufficient to substantially remove the residual reaction components from the surface. Typically the cleaning agent is contacted with the surface at a pressure of between 0.0 bar and 10.0 bar and at a temperature in a range of between 50° C. and 350° C. for a period of time between 1 minute and 8 hours. It is sometimes preferred that the cleaning agent is contacted with the surface at a pressure of between 0.5 bar and 3.0 bar and at a temperature in a range of between 200° C. and 300° C. for a period of time between 10 minutes and 4 hours. More preferably the cleaning agent is contacted with the surface at a pressure of between 0.9 bar and 1.5 bar and at a temperature in a range of between 210° C. and 230° C. for a period of time between 15 minutes and 2 hours. In another embodiment it is preferred that the cleaning agent is contacted with the surface at an operating pressure and at or above the boiling point temperature of the ester-substituted phenol so that the cleaning agent refluxes in the reactor at the operating pressure for a period of time between 15 minutes and 2 hours. After the cleaning agent is maintained in contact with the surface at conditions sufficient to substantially remove the residual reaction components from the surface, the cleaning agent and the removed residual reaction components are removed from the melt polymerization reactor system. In one embodiment the reactor system is drained by gravity by removing a drain plug at the bottom of the reactor system. It is sometimes found that remnants of the cleaning agent and the removed residual reaction components are still trapped in the reactor system in which case a rinse of the system with additional cleaning agent or water is often desired. In another embodiment the reactor system is placed under vacuum and heated to drive off remaining cleaning agent.

In another exemplary embodiment of the present invention, after the completion of a polycarbonate production run, a cleaning agent is introduced to the reactor system and into contact with a surface of the melt polymerization reactor system having residual reaction components of a melt polymerization reaction thereon. The cleaning agent comprises a phenolic compound (e.g. either a non-ester-substituted phenol or an ester-substituted phenol) and a basic compound as described above. It is preferred that the amount of cleaning agent introduced to the reactor system be sufficient to contact the entire polymerization area within the reactor system. The cleaning agent is maintained in contact with the surface for a period of time and at a temperature sufficient to substantially remove the residual reaction components from the surface. Typically the cleaning agent is contacted with the surface at the conditions as described above. After the cleaning agent is maintained in contact with the surface at conditions sufficient to substantially remove the residual reaction components from the surface, the cleaning agent and the removed residual reaction components are removed from the melt polymerization reactor system as described above. Since the basic compound is also a catalyst in a melt polymerization reaction, it is preferred that it is substantially removed from the reactor system after cleaning and prior to a subsequent polymerization run on the system. For example, it is preferred that the basic compound of the cleaning agent be removed from the reactor system after cleaning such that it is present in the reaction components within the reactor system of an immediately subsequent polymerization run in an amount of less than 100 ppm, more preferably less than 10 ppm, still more preferably less than 1 ppm, and most preferably less than 0.5 ppm. In order to achieve these levels, it is desirable to rinse the reactor, after the cleaning agent is removed, with either the phenolic compound or water. In the case where a metal hydroxide such as NaOH is used as the base in the cleaning agent it is preferred that the reactor system be thoroughly rinsed after cleaning and prior to running a subsequent polymerization reaction. In the case where thermally decomposable, or volatile, or both thermally decomposable and volatile base is employed the reactor may be heated, placed under vacuum, or preferably both heated and placed under vacuum to drive off the remaining base left in the reactor.

The used cleaning agent removed from the reactor system containing the removed residual reaction components may then be cooled and subjected to standard recycling steps wherein the removed residual reaction components are separated from the cleaning agent so that the cleaning agent may be reused. It has been observed that the cleaning agent comprising phenol solidifies and forms a single phase along with the residual reaction components. Recycling of the phenol for use again as a cleaning agent requires the purification and removal of the phenol from the residual reaction components.

It has herein been found that where the cleaning agent is an ester-substituted phenol such as methyl salicylate, the combination of the cleaning agent and the residual reaction components separate into two phases upon cooling. The recovery of the ester-substituted phenol may then be accomplished by removing the separated phase. The ester-substituted phenol may be further purified by standard distillation steps.

Polycarbonate Production

In another embodiment a method is provided for cleaning a reactor system and subsequently producing polycarbonate therein. The method includes the steps of cleaning the reactor system as described above and subsequently running a melt polymerization reaction therein. The cleaning agent employed in this particular embodiment comprises a phenolic compound and a basic compound. The residual reaction components of the initial melt polymerization reaction comprise a dihydroxy compound and polycarbonate oligomers or polymers comprising repeat units derived from the dihydroxy compound. After cleaning the reaction system, a molten reaction mixture comprising a dihydroxy compound different from that of the residual reaction components, a diaryl carbonate, and a catalyst system are contacted under melt polymerization conditions within the reaction system where they react such that polymer is built to a molecular weight ($M_w$) greater than 10,000 g/mol(molecular weights measured relative to polystyrene (PS) standards) and more preferably greater than 18,000 g/mol(molecular weights measured relative to polystyrene (PS) standards). It is preferred that the resulting polycarbonate produced by this method will have a level of detectable residual reaction components of less than 2,500 ppm, more preferably less than 1,000 ppm, and most preferably less than 500 ppm.

The term "contacting under melt polymerization conditions" will be understood to mean those conditions necessary to effect reaction between the diaryl carbonate and the dihydroxy compounds employed according to the method of the present invention. The reaction temperature is typically in the range between 150° C. and 350° C., more preferably between 180° C. and 310° C. The reaction is preferably carried out in the presence of a transesterification catalyst described below. The pressure may be at atmospheric pressure, supra atmospheric pressure, or a range of pressures, for example from 2 atmospheres to 15 torr in the initial stages of the polymerization reaction, and at a reduced pressure at later stages, for example in a range between 15 torr and 0.1 torr. The reaction time is generally in a range between 0.1 hours and 10 hours, preferably between 0.1 and 5 hours. The reaction is suitably carried out in the melt polymerization reactor system to form high molecular weight polycarbonates.

The Carbonate Source

In the production of polycarbonate in accordance with the present invention, the compounds which react with the dihydroxy compounds to form carbonate linkages (the carbonate source) may be carbonate diesters, carbonyl halides, etc. Specific examples include: diphenyl carbonate, ditolyl carbonate, bis(chlorophenyl)carbonate, m-cresyl carbonate dinaphthyl carbonate, bis(diphenyl)carbonate, diethyl carbonate, dimethyl carbonate, dibutyl carbonate, dicyclohexyl carbonate, and other carbonate diesters, phosgene, and other carbonyl halides. Of the various compounds of this type and wherein the reactor system is cleaned using phenol as the phenolic compound, diphenyl carbonate is often preferred.

The carbonate can also be derived from an activated dicarbonate or a mixture of an activated carbonate with non-activated carbonate. A preferred activated carbonate of the present invention is an activated diarylcarbonate such as bismethylsalicylcarbonate (BMSC). However, as used herein the term "activated carbonate" is defined as a diarylcarbonate which is more reactive than diphenyl carbonate toward transesterification reactions. Such activated carbonates are of the general formula:

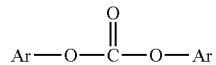

wherein Ar is a substituted aromatic radical having 6 to 30 carbon atoms. The preferred activated carbonates have the more specific general formula:

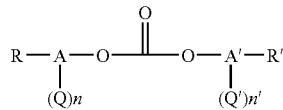

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

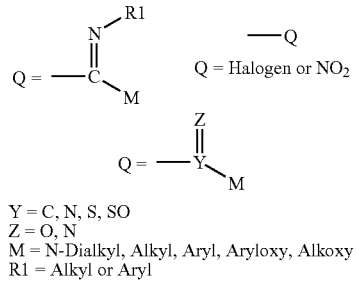

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl)carbonate.. Unsymmetrical combinations of these structures, where the substitution number and type on A and A' are different, are also possible to employ in the current invention. A preferred structure for an activated carbonate is an ester-substituted diarylcarbonate having the structure:

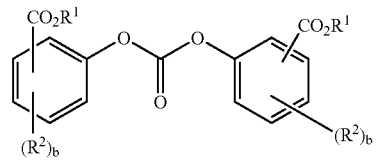

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R'$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically bis(methylsalicyl)carbonate is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diarylcarbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200 C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses an equilibrium constant of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diarylcarbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The theoretical stoichiometry of the reaction within the equilibration vessel requires a molar ratio of dihydroxy composition to diaryl carbonate composition of 1:1. However, in practicing the present invention the molar ratio in the equilibration vessel is suitably between 0.25:1 to 3:1, more preferably 1:0.95 to 1:1.05 and more preferably 1:0.98 to 1:1.02.

The Dihydroxy Compound

A preferred dihydroxy composition of the present invention is bisphenol A (BPA). However, other dihydroxy compounds of the present invention can be used and are selected from the group consisting of bisphenols having structure I,

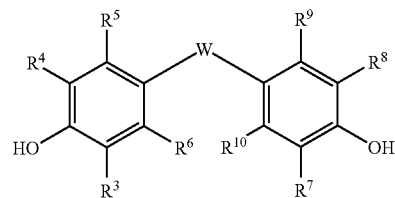

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

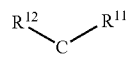

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure II

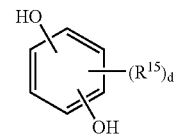

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures III and IV

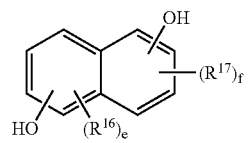

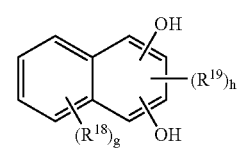

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols I are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-diisopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-diisopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-diisopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

Suitable dihydroxy benzenes II are illustrated by hydroquinone, resorcinol, methylhydroquinone, butylhydroquinone, phenylhydroquinone, 4-phenylresorcinol and 4-methylresorcinol.

Suitable dihydroxy naphthalenes III are illustrated by 2,6-dihydroxy naphthalene; 2,6-dihydroxy-3-methyl naphthalene; and 2,6-dihydroxy-3-phenyl naphthalene.

Suitable dihydroxy naphthalenes IV are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of monomers are selected based on the desired composition of the oligomers. If other comonomers are used, they can be introduced to the melt reaction system as part of the same feed, in a separate feed, or both.

The Catalyst System

The method of the invention also comprises the step of introducing a catalyst to the melt reaction system to initiate a polymerization reaction. The catalyst may be introduced continuously, or may be introduced batchwise and may occur before, during or after the introduction of the dihydroxy composition or the activated carbonate to the melt react system.

The catalyst used in the method of the present invention is a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between about $10^{-5}$ and about $10^{-8}$ moles alkaline earth or alkali metal ion per mole of dihydroxy compound employed.

The quaternary ammonium compound is selected from the group of organic ammonium compounds having structure VI,

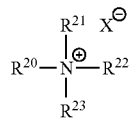

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic ammonium compounds comprising structure VI are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure VII,

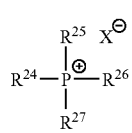

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds comprising structure VII are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in structures VI and VII are properly balanced. For example, where $R^{20}$-$R^{23}$ in structure VI are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

In order to achieve the formation of polycarbonate using the method of the present invention an effective amount of catalyst must be employed. The amount of catalyst employed is typically based upon the total number of moles of the total dihydroxy compounds employed in the polymerization reaction. When referring to the ratio of catalyst, for example phosphonium salt VII, to all dihydroxy compounds employed in the polymerization reaction, it is convenient to refer to moles of phosphonium salt per mole of the first and second dihydroxy compounds combined, meaning the number of moles of phosphonium salt divided by the sum of the moles of each individual dihydroxy compound present in the reaction mixture. The amount of organic ammonium or phosphonium salts VI or VII employed typically will be in a range between about $1 \times 10^{-2}$ and about $1 \times 10^{-5}$, preferably between about $1 \times 10^{-3}$ and about $1 \times 10^{-4}$ moles per mole of the dihydroxy compounds combined. The inorganic metal hydroxide catalyst typically will be used in an amount corresponding to between about $1 \times 10^{-4}$ and about $1 \times 10^{-8}$, preferably $1 \times 10^{-4}$ and about $1 \times 10^{-7}$ moles of metal hydroxide per mole of the dihydroxy compounds combined.

EXAMPLES

Having described the invention in detail, the following examples are provided. The examples should not be considered as limiting the scope of the invention, but merely as illustrative and representative thereof.

The molecular weight measurements of the materials prepared in the examples have been carried out by means of Gel Permeation Chromatography (GPC). A 12-point calibration line covering the entire molecular weight range of was constructed using polystyrene standards with a narrow molecular weight distribution (polydispersity (PD) of less than 1.01). All polycarbonate samples were measured against the calibration curve and molecular weights were expressed relative to the measured polystyrene molecular weights. Polycarbonate BPA homopolymer oligomers and polymers were dissolved in chloroform solvent prior to measurement, and the terpolymer oligomers and polymers were dissolved instead in a mixed solvent (15/85 vol/vol) of hexafluoroisopropanol (HFIP) and chloroform. For both the homopolymer and terpolymer samples the mobile phase was a mixed solvent (5/95 vol/vol) of HFIP in chloroform. Because further changes in molecular weight may sometimes occur in solution depending on the nature of the polymer and the solvent, it is important to carry out the GPC analysis rapidly after a good solution of polycarbonate in a good solvent and strong eluent is obtained and before any degradation of the polycarbonate occurs. Therefore all of the terpolymer GPC measurements were carried out within two hours of preparing the terpolymer solutions. The temperature of the gel permeation columns was 35° C.

It will be appreciated by one skilled in the art that the analysis of other polycarbonate homopolymers and copolymers may necessitate the use of variations in or other polymer concentrations, polystyrene molecular weight standards, solvent systems, dissolution methods, eluents/mobile phases, stationary phases (composition, crosslinking, porosity, surface functionalization), detector systems (such as those based on refractive index or UV or infrared absorption) and instrumental parameters (flow rate, temperature, and pressure). For example, the mobile phase should be a good solvent for the polymer, not interfere with the detector response of the polymer, and should wet the surface of the stationary phase (column packing) well. Since the GPC method is quite sensitive to the hydrodynamic volume of the polymer chain, polymer-solvent interactions may have a significant influence on the retention times measured. In addition, for the measurement of some copolymers, it may be necessary to use multiple detector systems. Care must be taken to avoid reaction between the solute (polymer) and the stationary phase or any other adsorption phenomena. Such care may be especially important when two solvents are used, one to dissolve the polymer and the other as eluent. Changing over the solvent system in the chromatograph may also take long periods of time of 24 hours or more before the baseline stabilizes. Such aspects of the GPC measurement method are discussed in Size Exclusion Chromatography by S. Mori and H. G. Barth (ISBN 3-540-65635-9), Chapter 18 of Polymer Synthesis and Characterization by S. R. Sandler, W. Karo, J.-A. Bonesteel, and E. M. Pierce (ISBN 0-12-618240-X), Chapter 3 of Introduction to Polymers by R. J. Young and P. A. Lovell (ISBN 0-412-30630-1), all three of which are incorporated here by reference. It will also be appreciated by one skilled in the art that some small variations in the retention times and thus the determined molecular weight may be observed based on variations in these various parameters in the GPC method.

It will be furthermore appreciated by one skilled in the art that the GPC method may not be universally applicable for the determination of polymer molecular weights or to determine whether one has obtained a "polycarbonate polymer" as used here. For example, some polymers may be insoluble due to very high molecular weights, their composition, crystallinity or branching. In such cases, it is possible by melt flow rate or melt viscosity measurements to determine whether one has obtained a "polycarbonate polymer" as used here.

Melt mass-flow rate (MFR) and melt volume-flow rate (MVR) of polycarbonates are measures of the extrusion rate of a polycarbonate melt through a die with a specified length and diameter under set conditions of temperature and loads. Such measurements are typically made according to ISO 1133, which is hereby incorporated by reference. These melt flow rate techniques are based on the principle that flow increases with decreasing polymer viscosity for a given temperature and load test condition. A higher MVR value indicates a smaller viscosity under an applied stress (load or weight in kg) and generally decreases as the molecular weight of a particular type of polymer increases. The test temperature is usually set at or slightly above the melting region of the material being characterized. Melt viscosity is a measurement of the rheological characteristics of thermoplastics at temperatures and shear conditions common to processing equipment. Melt viscosities are typically determined by pressing a melt through a die while measuring the pressure drop over the complete or part of this die, and such measurements are typically conducted according to ISO 11443, which is hereby incorporated by reference. Zero shear rate viscosities may be determined by measuring the melt viscosity of a polymer at various shear rates and then extrapolating the data to a shear rate of zero. Melt viscosities generally increase as the molecular weight of a particular type of polymer increases. It is important to avoid degradation of the polymer in the melt flow rate or melt viscosity measurement. One skilled in the art will recognize that degradation of the polymer may be avoided by carefully drying the polymer prior to measurement to remove water and the careful selection of measurement parameters such as the measurement temperature and the use of an inert atmosphere, if needed. The importance of these various measurement parameters and their optimization in the melt flow rate and melt viscosity measurement methods are described in Rheology—Principles, Measurements and Applications by C. W. Macosko (ISBN 0-471-18575-2), Rheological Techniques by R. W. Whorlow (ISBN 0-13-775370-5), Flow Properties of Polymer Melts by J. A. Brydson, (ISBN 0-59-205458-6), all three of which are hereby incorporated by reference. One skilled in the art may therefore determine if an insoluble sample is a "polycarbonate polymer" as used here by comparing the melt flow rate or melt viscosity at zero shear viscosity of the insoluble polymer with that of a polycarbonate BPA-based homopolymer having a molecular weight of at 10,000 g/mol when measured relative to polystyrene standards according to the GPC method. The insoluble sample is a "polycarbonate polymer" as used here, if it has a melt flow rate at least as low as that of the polycarbonate homopolymer or a melt viscosity at least as high as that of the polycarbonate homopolymer when measured under the same conditions.

Materials

The following materials were used in the following Invention Examples and Comparative Examples:

Methyl salicylate: Industrial grade, Rhodia Organique.

25 mass % TMAH solution: Sachem Inc.

Terpolymer: A terpolymer of BPA, Hydroquinone (HQ), and Methylhydroquinone (MeHQ), endcapped with para-cumylphenol (PCP) was prepared. Extruded pellets were used in the corresponding examples. The number average molecular weight, Mn, and weight average molecular weights, Mw, of this terpolymer based on polystyrene molecular weight standards were 24,138 g/mol and 65,661 g/mol, respectively.

Equipment

Reactor system cleaning examples were conducted on a melt polymerization reactor system equipped with a devolatizing extruder, as described in U.S. Pat. No. 6,790,929. Model laboratory experiments were conducted also on glass reactors adapted for distillation under vacuum, as described in the General Experimental Methods section of U.S. Pat. No. 6,870,025.

Note: Invention Examples 1 and 4 and Comparative Example 3 were performed on a melt polymerization reactor system equipped with a devolatizing extruder. All other examples were done on the glass reactors.

Invention Example 1

After a BPA polycarbonate production run in a melt polymerization reactor, methyl salicylate (MS)—equivalent to 20% of the maximum liquid level in the reactor—was introduced into reactor, the agitator was switched on and at atmospheric pressure the reactor was heated to the boiling point of MS, approximately 221° C. After boiling for 15 minutes MS was pumped out to a receiver. No solidification issues in the reactor were observed. Cleaning efficiency was satisfactory and the subsequent production run afforded a high quality polycarbonate without apparent discoloration.

Invention Example 2

A mixture of BPA melt polycarbonate oligomers of approximate molecular weight 15,000 g/mol (molecular weights measured relative to polystyrene (PS) standards) and MS, mass ratio 1:4, was heated to 170° C. and subsequently stirred while heating to maintain that temperature for 11 minutes. Upon stopping the agitators and heating the mixture was homogeneous. Within the following 10 minutes phase separation occurred.

Comparative Example 1

A mixture of BPA melt polycarbonate oligomers of approximate molecular weight 15,000 g/mol (molecular weights measured relative to polystyrene (PS) standards) and Phenol, mass ratio 1:4, was heated to 170° C. and subsequently stirred while heating to maintain that temperature for 11 minutes. Upon stopping the agitators and heating the mixture was homogeneous. The mixture was cooled and formed a single solid phase without showing any phase separation.

Invention Example 3

Invention Example 2 was repeated but instead of the melt BPA polycarbonate oligomer, a BPA polycarbonate of approximately molecular weight 35,000 g/mol (molecular weights measured relative to polystyrene (PS) standards) was used. In this example the mixture was heated and stirred at 170° for 20 minutes. Similar to the results of Invention Example 2, upon stopping agitation and heating, the mixture was homogeneous and clear. Upon cooling the mixture again separated to give a liquid MS phase and a solid phase of polycarbonate.

Comparative Example 2

Comparative Example 1 was repeated but instead of the melt BPA polycarbonate oligomer, a BPA polycarbonate of approximately molecular weight 35,000 g/mol (molecular weights measured relative to polystyrene (PS) standards) was used. In this example the mixture was heated and stirred at 170° for 20 minutes. Similar to the results of Invention Example 2, upon stopping the agitators and heating the mixture was homogeneous and clear. Upon cooling the mixture solidified without undergoing phase separation.

Discussion of Invention Examples 1-3 and Comparative Examples 1 and 2

Invention Example 1 demonstrates the method of cleaning a melt BPA reactor system with an ester-substituted phenol of the present invention. Invention Examples 2 and 3 as compared to Comparative Examples 1 and 2 demonstrate how a spent cleaning agent comprising an ester-substituted phenol and removed residual reaction components can be readily purified for re-use by means of simple separation methods by cooling the spent MS mixture and precipitation of the removed residual reaction components (polymer).

Comparative Example 3

After a co-polycarbonate production run (copolymer of Hydroquinone and BPA) on a melt polymerization reactor, the reactor was covered with a layer of oligomer crystals. MS—equivalent to 40% of the maximum liquid level in the reactor—was introduced into reactor, the agitator was switched on and the reactor, at atmospheric pressure, was heated to the boiling point of MS, approximately 221° C. After boiling for 60 minutes MS was pumped out to a receiver. The reactor was dried under a reduced pressure of approximately 5 mbar and at a temperature of about 230° C. The reactor sight glass was removed, and a visual inspection of the reactor showed that crystals had been left covering the internal surfaces of the reactor.

Invention Example 4

After the cleaning as described in Comparative Example 3, MS—equivalent to 40% of the maximum liquid level in the reactor—was introduced into the reactor. Additionally, 25 mass % TMAH (Tetramethyl Ammonium Hydroxide) solution was also introduced into the reactor to yield a TMAH concentration of approximately 1,000 ppm. The agitator was switched on and the reactor at atmospheric pressure was heated to the boiling point of MS, approximately 221° C. After boiling for 60 minutes, MS was pumped out to a receiver. The reactor was dried under a reduced pressure of approximately 5 mbar and at a temperature of 230° C. The reactor sight glass was removed and a visual inspection of the reactor showed that most of the crystals were removed. After a final rinse cycle using MS alone, the reactor system was successfully used for further polymerizations with no disturbance to reactivity or negative impact on such desirable polymer properties as color.

Invention Example 5

A 90:10 (mass:mass) mixture of Methyl Salicylate (22.5 g) and Terpolymer (2.5 g) were placed in a glass tube reactor along with 0.5 mass % of tetramethyl ammonium hydroxide (TMAH) (0.5 g of a 25 mass % solution in water). A stirrer was placed in the tube, and it was mounted on a small-scale melt reactor system. The reactor was briefly pumped three times to a vacuum level of 20 mbar and purged each time with nitrogen and then left under nitrogen at atmospheric pressure. The reactor was then heated to 230° C. Some distillation of the methyl salicylate was observed, and heating was continued for another 10 minutes. The heating was then stopped, the reactor tube was demounted and the low viscosity liquid was then removed from the tube. The low viscosity liquid remained free flowing as it cooled to room temperature. Only a small residue remained on the very bottom wall of the reactor tube.

The low viscosity liquid was analyzed using both HPLC to quantify the content of any residual monomeric species and SEC analysis was used to quantify the molecular weight properties of any oligomeric or polymeric species present in the liquid. The analyses indicated that the low viscosity liquid contained about 3,000-5,000 ppm of BPA, 1,000-2,000 ppm of HQ & MeHQ and several unidentified low molecular weight species but no measurable quantity of any polymeric species.

Invention Example 6

Invention Example 5 was repeated but instead the heating at 230° C. was carried out for 20 minutes. This sample also yielded a free-flowing liquid at room temperature. Subsequent HPLC and SEC analyses also found only the presence of large quantities of BPA, HQ, & Me HQ monomers and no measurable quantity of any polymeric species.

Comparative Example 4

Invention Example 5 was repeated but instead no TMAH base was added. This sample was very viscous and rapidly yielded a solid gel as it cooled. Subsequent HPLC analysis measured no detectable BPA, HQ or MeHQ. The SEC analysis indicated only a partial decrease in molecular weight to yield a material having a Mn of 8,418 g/mol and a Mw of 25,618 g/mol (molecular weights measured relative to polystyrene (PS) standards).

Comparative Example 5

Invention Example 6 was repeated but instead no TMAH base was added. This sample was very viscous and rapidly yielded a solid gel as it cooled. As in the case of Comparative Example 4, subsequent HPLC analysis measured no detectable BPA, HQ or MeHQ. The SEC analysis also indicated only a partial decrease in molecular weight to yield a material having a Mn of 6,447 g/mol and a Mw of 22,040 g/mol (molecular weights measured relative to polystyrene (PS) standards).

Discussion of Comparative Examples 3-5 and Invention Examples 4-6

A comparison of Comparative Example 3 and Invention Example 4 indicates that cleaning reactor systems using an optionally ester-substituted phenol in combination with a base is more effective than the use of the ester-substituted phenol alone when cleaning reactor system producing polycarbonate with monomers other than BPA. Similar comparisons of the Comparative Examples 4 and 5 to Invention Examples 5 and 6 indicate that the combination of ester-substituted phenol and base is also more effective in reducing high molecular weight polymer residues, containing monomers other than BPA, to low viscosity solutions containing individual monomer species. In addition, invention examples 5-6 indicate that this change can be brought about quite rapidly, within minutes, when a base is used together with a phenolic compound.

Invention example 4 indicates that an optional final rinse of the reactor system may be desirable and that high levels (amounts at or above 1,000 ppm) of a base could be used without disturbing subsequent polymerization runs provided that the reactor system is rinsed after cleaning and/or the base is readily thermally decomposable to give volatile products or has appreciable high temperature volatility itself.

The invention claimed is:

1. A method for cleaning a surface of a melt polymerization reactor system having residual reaction components of a melt polymerization reaction thereon, comprising the steps of:
(a) introducing a cleaning agent to the melt polymerization reactor system and into contact with the surface of the melt polymerization reactor system having residual reaction components of a melt polymerization reaction thereon,
(b) maintaining the cleaning agent in contact with the surface for a period of time and at a temperature sufficient to substantially remove the residual reaction components from the surface, and
(c) removing the cleaning agent and the removed residual reaction components from the melt polymerization reactor system,
wherein, the cleaning agent comprises an ester-substituted phenol and wherein the residual reaction components of the melt polymerization reaction comprise polycarbonate oligomers or polymers,
thereby cleaning a surface of a melt polymerization reactor system having residual reaction components of a melt polymerization reaction thereon.

2. The method of claim 1, wherein the ester-substituted phenol is selected from the group consisting of phenyl salicylate, methyl salicylate, ethyl salicylate, isopropyl salicylate, n-propyl salicylate, and benzyl salicylate.

3. The method of claim 1, wherein the cleaning agent is contacted with the surface at a pressure of between 0.9 bar and 1.5 bar and at a temperature in a range of between 210° C. and 230° C., for a period of time between 15 minutes and 2 hours.

4. The method of claim 1, wherein the cleaning agent is contacted with the surface at an operating pressure and at or above the boiling point temperature of the ester-substituted phenol at the operating pressure, for a period of time between 15 minutes and 2 hours.

5. A method for cleaning a surface of a melt polymerization reactor system having residual reaction components of a melt polymerization reaction thereon, comprising the steps of:
(a) introducing a cleaning agent to the melt polymerization reactor system and into contact with the surface of the melt polymerization reactor system having residual reaction components of a melt polymerization reaction thereon,
(b) maintaining the cleaning agent in contact with the surface for a period of time and at a temperature sufficient to substantially remove the residual reaction components from the surface, and
(c) removing the cleaning agent and the removed residual reaction components from the melt polymerization reactor system,
wherein, the cleaning agent comprises a phenolic compound and a basic compound and wherein the residual reaction components of the melt polymerization reaction comprise polycarbonate oligomers or polymers,
thereby cleaning a surface of a melt polymerization reactor system having residual reaction components of a melt polymerization reaction thereon.

6. The method of claim 5, wherein the phenolic compound is phenol.

7. The method of claim 5, wherein the phenolic compound is an ester-substituted phenol.

8. The method of claim 7, wherein the ester-substituted phenol is selected from the group consisting of phenyl salicylate, methyl salicylate, ethyl salicylate, isopropyl salicylate, n-propyl salicylate, and benzyl salicylate.

9. The method of claim 5, wherein the basic compound is NaOH.

10. The method of claim 5, wherein the basic compound is thermally decomposable, or volatile, or both thermally decomposable and volatile at a pressure between 0.0 bar and 10.0 and at the temperature at which the cleaning agent is maintained.

11. The method of claim 10, wherein the cleaning agent is contacted with the surface at a pressure of between 0.9 bar and 1.5 bar and at a temperature in a range of between 210° C. and 230° C., for a period of time between 15 minutes and 2 hours.

12. The method of claim 10, wherein the cleaning agent is contacted with the surface at an operating pressure and at or above the boiling point temperature of the phenolic compound at the operating pressure, for a period of time between 15 minutes and 2 hours.

13. The method of claim 10, wherein the basic compound has the structure,

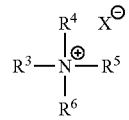

wherein $R^3$- $R^6$ are independently a $C_1$-$C_{20}$ alkyl radical, $C_4$-$C_{20}$ cycloalkyl radical, or a $C_4$-$C_{20}$ aryl radical, and $X^-$ is an organic or inorganic anion.

14. The method of claim 13, wherein the basic compound is selected from the group consisting of tetramethyl ammonium hydroxide, tetrabutyl ammonium hydroxide, tetramethyl ammonium acetate, tetramethyl ammonium formate, tetrabutyl ammonium acetate, methyl tributyl ammonium chloride, tetramethyl ammonium hydroxide, tetrabutyl ammonium chloride and decyl trimethyl ammonium chloride.

15. The method of claim 10, wherein the basic compound has the structure,

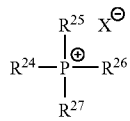

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion.

16. The method of claim 15, wherein the basic compound is selected from the group consisting of tetramethyl phosphonium hydroxide, tetramethyl phosphonium acetate, tetramethyl phosphonium formate, tetrabutyl phosphonium hydroxide, and tetrabutyl phosphonium acetate.

17. The method of claim 10, wherein the amount of the basic compound present in the cleaning agent is in a range of between 100 ppm and 2,000 ppm.

18. A method of forming polycarbonate in a melt polymerization reactor system, the method comprising the steps of:
  (i) cleaning a surface of a melt polymerization reactor system having residual reaction components of a melt polymerization reaction thereon, by:
    (a) introducing a cleaning agent to the melt polymerization reactor system and into contact with the surface of the melt polymerization reactor system having residual reaction components of a melt polymerization reaction thereon,
    (b) maintaining the cleaning agent in contact with the surface for a period of time and at a temperature sufficient to substantially remove the residual reaction components from the surface, and
    (c) removing the cleaning agent and the removed residual reaction components from the melt polymerization reactor system,
    wherein, the cleaning agent comprises a phenolic compound and a basic compound and wherein the residual reaction components of the melt polymerization reaction comprise a dihydroxy compound and polycarbonate oligomers or polymers comprising repeat units derived from the dihydroxy compound,
  thereby cleaning a surface of a melt polymerization reactor system having residual reaction components of a melt polymerization reaction thereon,
  (ii) in the melt polymerization reactor system, contacting under melt polymerization conditions a molten reaction mixture comprising a dihydroxy compound different from that of the residual reaction components, a diaryl carbonate, and a catalyst system, and
  (iii) in the melt polymerization reactor system, allowing the reaction components to react wherein polymer is built to a molecular weight ($M_w$) greater than 18,000 g/mol (measured relative to polystyrene (PS) standards), and wherein the level of detectable residual reaction components is less than 2,500 ppm, thereby forming polycarbonate in a melt polymerization reactor system.

19. A cleaning agent for cleaning a surface of a melt polymerization reactor system having residual reaction components of a melt polymerization reaction thereon, wherein the cleaning agent consists of a phenolic compound and a basic compound, wherein the basic compound is present in an amount of at least 10 ppm and is thermally decomposable, or volatile, or both thermally decomposable and volatile at a pressure between 0.0 bar and 10.0 bar and at a temperature of between 50° C. and 350° C.

20. The cleaning agent of claim 19, wherein the phenolic compound is phenol.

21. The cleaning agent of claim 19, wherein the phenolic compound is an ester-substituted phenol.

22. The cleaning agent of claim 21, wherein the ester-substituted phenol is selected from the group consisting of phenyl salicylate, methyl salicylate, ethyl salicylate, isopropyl salicylate, n-propyl salicylate, and benzyl salicylate.

23. The cleaning agent of claim 19, wherein the basic compound is thermally decomposable, or volatile, or both thermally decomposable and volatile at a pressure of between 0.9 bar and 1.5 bar and at a temperature in a range of between 210° C. and 230° C.

24. The cleaning agent of claim 19, wherein the basic compound has the structure,

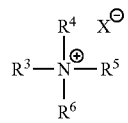

wherein $R^3$-$R^6$ are independently a $C_1$-$C_{20}$ alkyl radical, $C_4$-$C_{20}$ cycloalkyl radical, or a $C_4$-$C_{20}$ aryl radical, and $X^-$ is an organic or inorganic anion.

25. The cleaning agent of claim 24, wherein the basic compound is selected from the group consisting of tetramethyl ammonium hydroxide, tetrabutyl ammonium hydroxide, tetramethyl ammonium acetate, tetramethyl ammonium formate, tetrabutyl ammonium acetate, methyl tributyl ammonium chloride, tetramethyl ammonium hydroxide, tetrabutyl ammonium chloride and decyl trimethyl ammonium chloride.

26. The cleaning agent of claim 19, wherein the basic compound has the structure,

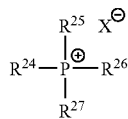

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion.

27. The cleaning agent of claim 26, wherein the basic compound is selected from the group consisting of tetramethyl phosphonium hydroxide, tetramethyl phosphonium acetate, tetramethyl phosphonium formate, tetrabutyl phosphonium hydroxide, and tetrabutyl phosphonium acetate.

28. The cleaning agent of claim 19, wherein the amount of the basic compound present in the cleaning agent is in a range of between 100 ppm and 2,000 ppm.

* * * * *

UNITED STATES PATENT AND TRADEMARK OFFICE
CERTIFICATE OF CORRECTION

| | | |
|---|---|---|
| PATENT NO. | : 7,365,149 B2 | |
| APPLICATION NO. | : 11/275110 | |
| DATED | : April 29, 2008 | |
| INVENTOR(S) | : Brack et al. | |

It is certified that error appears in the above-identified patent and that said Letters Patent is hereby corrected as shown below:

Column 28, Claim 10, Lines 43 through 44 should read: --10.0 bar and at the temperature at which the cleaning agent is maintained.--

Signed and Sealed this

Eighth Day of July, 2008

JON W. DUDAS
*Director of the United States Patent and Trademark Office*